(12) United States Patent
Bikkula et al.

(10) Patent No.: US 10,114,676 B2
(45) Date of Patent: Oct. 30, 2018

(54) BUILDING MULTIMODAL COLLABORATIVE DIALOGS WITH TASK FRAMES

(71) Applicant: Microsoft Technology Licensing, LLC, Redmond, WA (US)

(72) Inventors: Ravi Bikkula, Sammamish, WA (US); Danko Panic, Redmond, WA (US); Paul Crook, Bellevue, WA (US); Omar Zia Khan, Bellevue, WA (US); Ruhi Sarikaya, Redmond, WA (US); Hisami Suzuki, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

(21) Appl. No.: 14/704,564

(22) Filed: May 5, 2015

(65) Prior Publication Data

US 2016/0328270 A1    Nov. 10, 2016

(51) Int. Cl.
| | |
|---|---|
| *G06F 9/46* | (2006.01) |
| *G06F 9/50* | (2006.01) |
| *G06F 3/038* | (2013.01) |
| *G06F 9/48* | (2006.01) |

(52) U.S. Cl.
CPC ............ *G06F 9/5011* (2013.01); *G06F 3/038* (2013.01); *G06F 9/4881* (2013.01)

(58) Field of Classification Search
None
See application file for complete search history.

(56) References Cited

U.S. PATENT DOCUMENTS

| | | |
|---|---|---|
| 5,878,274 A | 3/1999 | Kono et al. |
| 6,829,603 B1 | 12/2004 | Chai et al. |

(Continued)

FOREIGN PATENT DOCUMENTS

EP    1705554    9/2006

OTHER PUBLICATIONS

PCT International Search Report in PCT/US2016/030486, dated Jul. 7, 2016, 13 pages.

(Continued)

*Primary Examiner* — Bing Zhao

(57) ABSTRACT

Methods and systems are provided for collaborative completion of tasks using task frames. Upon receiving a request to perform a task, a system utilizes task frames in completing the requested task. A task frame is a data structure that contains the parameters and status signals that represent a particular task and captures the combined system's understanding of a current state of the task. Input is received at a client device and sent to a server, where the input is processed. Based on the processed input, a task frame is retrieved and filled. The filled task frame is sent to the client device, where the client device performs actions based on the task frame and updates the task frame parameters and the state of the task. The updated task frame is returned to the server. The shared task frame provides improvements to the overall task completion process.

20 Claims, 12 Drawing Sheets

(56) References Cited

U.S. PATENT DOCUMENTS

| | | | |
|---|---|---|---|
| 7,028,306 | B2 | 4/2006 | Boloker et al. |
| 7,177,815 | B2 | 2/2007 | Ehlen et al. |
| 7,548,859 | B2 | 6/2009 | Thompson et al. |
| 8,731,942 | B2 | 5/2014 | Cheyer et al. |
| 8,942,986 | B2 * | 1/2015 | Cheyer ............... G06F 17/3087 704/275 |
| 8,954,330 | B2 | 2/2015 | Koenig et al. |
| 2003/0009517 | A1 | 1/2003 | Wang et al. |
| 2004/0122924 | A1 | 6/2004 | Coryell et al. |
| 2006/0143576 | A1 | 6/2006 | Gupta et al. |
| 2006/0235691 | A1 | 10/2006 | Tomasic et al. |
| 2012/0022872 | A1 | 1/2012 | Gruber et al. |
| 2014/0040748 | A1 | 2/2014 | Lemay et al. |
| 2014/0081633 | A1 | 3/2014 | Badaskar |
| 2014/0218372 | A1 | 8/2014 | Missig et al. |
| 2014/0365209 | A1 | 12/2014 | Evermann |
| 2015/0045003 | A1 | 2/2015 | Vora et al. |
| 2015/0081361 | A1 * | 3/2015 | Lee ....................... H04W 4/203 705/7.13 |

OTHER PUBLICATIONS

Milhorat, P. et al., "Building the Next Generation of Personal Digital Assistants", In Proceedings of 1st International Conference on Advanced Technologies for Signal and Image Processing, published Mar. 17, 2014, 6 pgs.

Lison, Pierre et al., "Spoken Dialogue Systems: The New Frontier in Human-Computer Interaction", In Magazine XRDS: Crossroads, the ACM Magazine for Students-Natural, vol. 21, Issue 1, published Oct. 14, 2014, 6 pgs.

Johnston, Michael et al., "The Multimodal Presentation Dashboard", In Proceedings of NAACL-HLT-Dialog of the Workshop on Bridging the Gap: Academic and Industrial Research in Dialog Technologies, published Apr. 2007, 8 pgs.

PCT 2nd Written Opinion in International Application PCT/US2016/030486, dated Apr. 4, 2017, 9 pgs.

"International Preliminary Report on Patentability Issued in PCT Application No. PCT/US2016/030486", dated Jun. 28, 2017, 10 Pages.

* cited by examiner

BUILDING MULTIMODAL COLLABORATIVE DIALOGS WITH TASK FRAMES

BACKGROUND

Digital assistant applications that can receive requests to perform tasks for users continue to grow in popularity. Many of these applications are being incorporated into personal computers, laptops, mobile devices, as well as other similar types of devices. As users continue to increase their reliance on digital assistant applications, the users' expectations for what a digital assistant application can do also continue to grow. Further, the variety of devices that are available to host digital assistant applications also continues to grow more numerous. Accordingly, improvements to the functionality of digital assistant applications are a useful area for advancement.

It is with respect to these and other general considerations that examples have been made. Also, although relatively specific problems have been discussed, it should be understood that the examples should not be limited to solving the specific problems identified in the background.

SUMMARY

The disclosure generally relates to systems and methods utilizing task frames in completing a task. A task frame is a data structure that contains the parameters and status signals that represent a particular task and captures the combined system's understanding of a current state of the task. When a user requests a digital assistant application on a client device to perform a task, the digital assistant application sends the request to a server. The server processes the input to determine a task. A task frame for the determined task is retrieved and filled to the extent possible based on the input. The updated task frame is sent to the client device, where the client device determines any actions it needs to perform based on the task frame. The client device performs the determined actions and updates the values of the parameters along with the status of the task. The updated task frame along with any additional input is returned to the server, where the server processes the task frame and any additional input. The server updates the values of the task frame parameters and the status of the task and returns the task frame to the client device. This process continues until the system is able to complete the task. Many improvements to the task completion process are realized through the use of task frames. This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
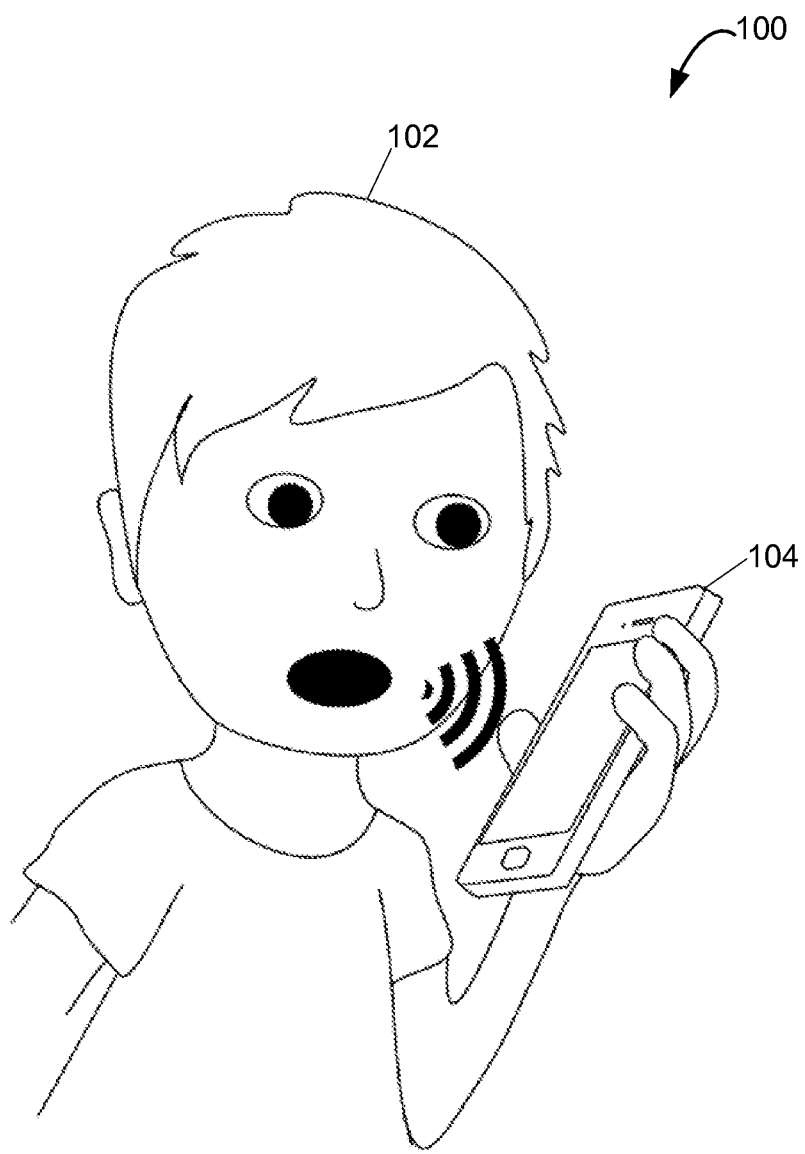
FIG. 1 depicts an environment for receiving input to a client device.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

The present disclosure relates generally to improving the technology behind intelligent digital assistant applications, such as the CORTANA digital assistant application offered by Microsoft Corporation of Redmond, Wash. As digital assistants gain popularity, its users request a broader amount of information and tasks to be completed by the digital assistant. Users similarly demand more accurate, quicker, and error-free results to their request. Such expanded requests and expectations can cause a potential strain on the functionality of the digital assistant. In addition, users are employing an increasing variety of devices to access digital assistant applications, making it desirable to provide an efficiently designed framework to communicate with each of these devices. Accordingly, improved systems and methods for processing of requests from users to digital assistants are provided in this disclosure.

Among other things, improved functionality results from a client device being able to collaboratively determine and accomplish user-requested tasks with a server. The collaborative aspects are achieved through the use of task frames. As used in the present disclosure, a task frame is a particular data structure that contains the parameters and status signals that represent a particular task and captures a combined system's understanding of a current state of the task. The parameters within the task frame may be required parameters or optional parameters. Different tasks may have predefined task frames that represent the details for each different task.

One example of a generic form of a task frame in an example architecture is as follows:

"TaskFrame":
{
   "URI": "task ://<TaskName>/<TaskAction>",

```
"Version": "1.0",
"Status": TaskStatus,
"<Param 1>": Parameter Value 1,
"<Param 2>": Parameter Value 2
... Param n,
"LG": string,
"TTS": string
}
```

In the above example task frame, the task frame has a location, or uniform resource identifier (URI), for a particular task and the particular action associated with the task. The task frame may also have the version of the task or the version of the task frame. The task frame also has a status or state for the task. The value of the status may differ at different stages of the task, and the types of values may differ between different tasks. For example, some values for the "TaskStatus" include "in progress," "completed," "canceled," and "prompted for confirmation," among other similar statuses.

In addition, the task frame has a series of parameters indicated as <Param 1>, <Param 2>, through <Param n> for n number of parameters. Each of these parameters has a respective value and the parameters may be required or optional parameters. A required parameter is one that is necessary to complete a task. For example, where the task is to call a person, the contact information of the person is a required parameter. An optional parameter is one that is not necessary to complete the task, but may be used in completing the task if available. For example, a parameter relating to whether a location such as a restaurant has a bar may be an optional parameter in a restaurant reservation task. As another example, in a send e-mail task, optional parameters may include names in a CC line, attachments, or the priority of a message.

One example of a parameter structure may be as follows:

```
"Param":
{
  "Role": Name,
  "Value": Entity,
  "Results": list<Entity>
}
```

In this example form of a parameter, the role indicates the role played by the parameter in the particular task. For example, the parameter may be a person or a location. The value field allows a singular entity to be stored and the results field allows a list of entities to be stored. As used in this application, the value and results fields may generally be referred to as a value or values of the parameter.

The parameters may include one or more task frame entities. Each entity may be represented as the following example form for an example architecture:

```
"Entity":
{
  "URI": "entity://<Type>"",
  "Version": "1.0",
  "State": EntityState,
  "Source": Source Value,
  "ClientUpdate": Boolean
}
```

In the above example of an entity representation, the name of the entity is included along with the location or URI of the entity. The version of the entity may also be included. The state of the entity is also included. The value for the state may differ between different entities. For example, some values for the "EntityState" include "filled," "uncertain," "change requested," and "prompted."

Task frames are shared between the client and the server. By sharing the task frames between the client and the server, the client device(s) and the server can operate as partners in updating task frames and resolving parameters or entities of the task frame. One benefit of such a design is that the resolution of the parameters or entities can occur where the most useful data resides. For instance, given a speech input of "Call Bob," the server may not be the best component to determine exactly who "Bob" is because the user's contact list may not reside on the server. Rather, in this example, the client device is in the best position to resolve the entity "Bob" because the user's contact list resides on the client device. The client device and server also synchronize their state by passing the task frames. Duplication of tasks and discrepancies, among other things, can be minimized by tracking the state of tasks within the task frame itself.

Shared use of the task frames also allows for the client device and the server to take on different roles depending on the particular situation in a repeatable extensible manner. For example, ownership of policies for selecting the next steps of particular tasks can reside either on the client, or, e.g., in the case of a thin client, on the server. User interface creation may also reside either on the client or the service. In systems having a central server, the server is able to support different modes in parallel where different clients are using different modes, without having to change the task frames themselves. In addition, the server is able to exchange information between tasks operating in different modes.

Further, by having defined task frames for each task, the task frames are able to operate over all input modalities. For example, each input modality, such as speech, touch, text, or otherwise, can be handled in an extensible manner as each input modality can be recorded directly in the task frame Turning to the figures, FIG. 1 depicts an environment 100 for providing input to a client device. The environment 100 including a user 102 and a client device 104. The client device 104 may be any suitable device, such as those devices described below with reference to FIGS. 7-10. The user 102 in environment 100 can provide input into the client device 104 by speaking into the device, as shown in FIG. 1. The user 102 may also provide input to the client device 104 through textual input from using a soft-keyboard or other type of text input device. The user may also provide input to the client device 104 through gestures recognized by, e.g., a touch-screen feature, motion detection, or a camera on the client device. Many options for providing input to the client device 104 are known to those having skill in the art and are contemplated here. Upon receiving the input from the user 102, the client device 104, executing a digital assistant application, determines what the user 102 has requested and performs the requested tasks. Further, as explained below, performing the requested tasks involves the use of task frames. In addition, as also described below, performing the requested tasks may also involve the use of other components, such as network-based services and components.

The environment 100 may change as the user 102 accesses a separate client device such as a laptop computer or personal computer. The environment 100 may also change as the user 102 changes location. For instance, the client device 104 may be a mobile device such as a smartphone. The user 102 may desire to have a speech recognition function on the client device 104 performed in multiple environments. The changes in environments may be measured or determined by the client device 104, which can then be used by a digital assistant application in performing the tasks requested by the user 102.

Figure 2:
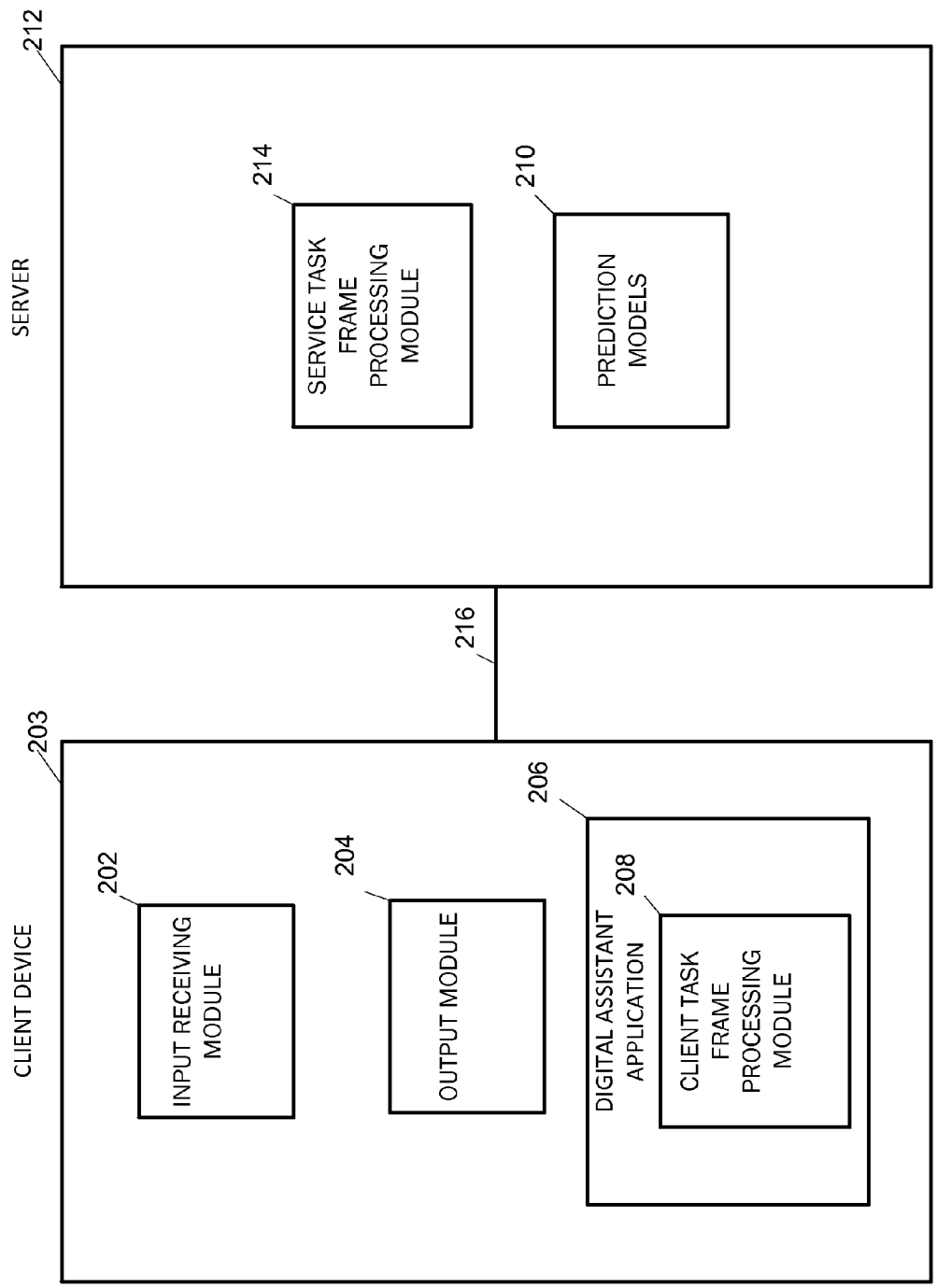
FIG. 2 depicts a system for utilizing a digital assistant application with task frames.

FIG. 2 depicts an example of a system 200 for utilizing a digital assistant application with task frames. FIG. 2 depicts a more detailed view of client device 203 and of a server 212. Client device 203 may comprise a client device such as client device 104. Further, client device 203 and server 212 may comprise one or more devices depicted and described with respect to FIGS. 7-10. Client device 203 has an input receiving module 202, an output module 204, and a digital assistant application 206. As used herein, "modules" include hardware, software, or a combination of hardware and software configured to perform the processes and functions described herein. In addition, as used herein, an "application" comprises instructions that, when executed by one or more processors, performs processes and functions described herein. Within the digital assistant application 206 is a client task frame processing module 208. The input receiving module 202 of the client device 203 is configured to collect input from a user. The input collected may be in the form of speech where the user provides voice input to the client device 203. The input may also be text input where the user types the input into the client device 203. The input may also be in the form of touch or a gesture that it is recognized by the input receiving module 202. When the input receiving module 202 receives the input from a user, the input is provided to the digital assistant application 206. The digital assistant application may determine whether the input can be handled locally, or if the input should be provided to the server 212. Generally, an initial input from a user to a digital assistant application 206 will be in the form of a request to perform a task or action. Where the input indicates that a task or action is requested, the digital assistant application 206 sends the input to the server 212 via a communication link 216. Communication link 216 may be achieved through any means known by those having skill in the art, such as a wireless or Internet connection.

Upon receiving the user input from the client device 203, the server 212 processes the input to determine the type of task requested along with other features of the request, such as parameters of the task requested. In examples, where the input form is that of speech, the server 212 performs a speech recognition process to produce a recognizable input to a service task frame processing module 214. The service task frame processing module 214 processes the input to determine the requested task. The determination of the requested task may also be accomplished through the use of prediction models 210. Upon determining the requested task, the service task frame processing module 214 retrieves the task frame corresponding to the determined task. The service task frame processing module 214 then fills in values for the parameters in the retrieved task frame to the extent possible and recognizable using the prediction models 210. For each of the parameters, the state of parameter may also be entered by the service task frame processing module 214. The status or state of the task itself is also updated by the service task frame processing module 214. After the service task frame processing module 214 enters the values for the parameters and other data fields into the task frame as required or optional by the particular task, the service task frame processing module 214 sends the task frame to the client device 104, where it is handled by the digital assistant application 206.

The task frame sent from the server 212 is processed by the client task frame processing module 208. By processing the task frame, the client task frame processing module 208 determines what actions need to be taken by the digital assistant application 206. For instance, the task frame may indicate that the digital assistant application 206 needs to request confirmation of a task or that the digital assistant application 206 needs to request from a user a value for a required parameter, such as a time or a place. In examples, a task frame data field will indicate the exact text that needs to be output to the user. If the client task frame processing module 208 determines that information needs to be output to the user, the output module 204 outputs the determined information. The format of the output may also be identified in the task frame. For example, in certain situations, it may be more useful to present the information as a visual output through a display screen. In other situations, it may be more useful to present the output as audio through a speaker or headphones. The output format may be based on the input format and other context available.

Where the task frame indicates that user input is required in response to the output, the input is received by the input receiving module 202 and processed by the digital assistant application 206 and the client task frame processing module 208. The additional input may be provided by any type of input modality, regardless of the input modality used for the initial input. For instance, if the initial input was provided by speech, the additional input could be touch, gesture, text, speech, or any other modality. By using task frames, these different modalities can be easily handled and tracked. In processing the additional input from the user, the client task frame processing module 208 updates the task frame based on the input. For instance, if a value for a required parameter was missing from the task frame and input was requested from the user, the received input may be used to update the value for the parameter. The value for the parameter can be more easily filled in by the client task frame processing module 208 where the input is in the form of text or a touch or gesture selecting an option or an item from a list. Where the input is of a type such as text or touch and the client task frame processing module 208 is able to update the value for the associated parameter in the task frame, the client task frame processing module 208 updates the value for the parameter. The client task frame processing module 208 also updates the field for the parameter to indicate whether the input was in the form of text input or touch input. The client task frame processing module 208 also updates the status field of the task frame to an appropriate value to indicate that input has been received from the user. After processing and updating the data fields of the task frame, the updated task frame is sent to the server 212.

Where the input is in the form of speech, the client device 104 may not have speech recognition capabilities locally. Thus, where the input is in the form of speech, the client task frame processing module 208 may update the type of input for the parameter. Upon completing the processing and updating of the task frame, the input speech audio is sent to the server 212 along with the updated task frame for recognition and processing by the server 212.

Upon receiving the updated task frame from the client task frame processing module 208, the service task frame processing module 214 processes the updated task frame. Where speech audio is also received, the prediction models 210 recognize the speech to provide a usable form of the recognized speech to the service task frame processing module 214. If the task frame status indicates that the task is completed, the server 212 takes no further action regarding that task. If the task status indicates that the task is incomplete and further action is necessary, the server 212 updates the parameter values that require updating that the server 212 is capable of updating. The service task frame processing module 214 similarly updates the status of the task frame and the status of parameter values that are updated. The server 212 then sends the updated task frame back to the client device 104, where the process discussed above repeats itself until the task is completed.

While the server 212 is depicted as being a single element, the functionality of the server 212 shown in FIG. 2 may be accomplished by multiple servers and networked services, as will be appreciated by those having skill in the art. As an example, the speech recognition features of the server 212 may be performed one service across one or more devices, and the task frame processing features of the server 212 may be performed by another service across one or more devices.

Figure 3:
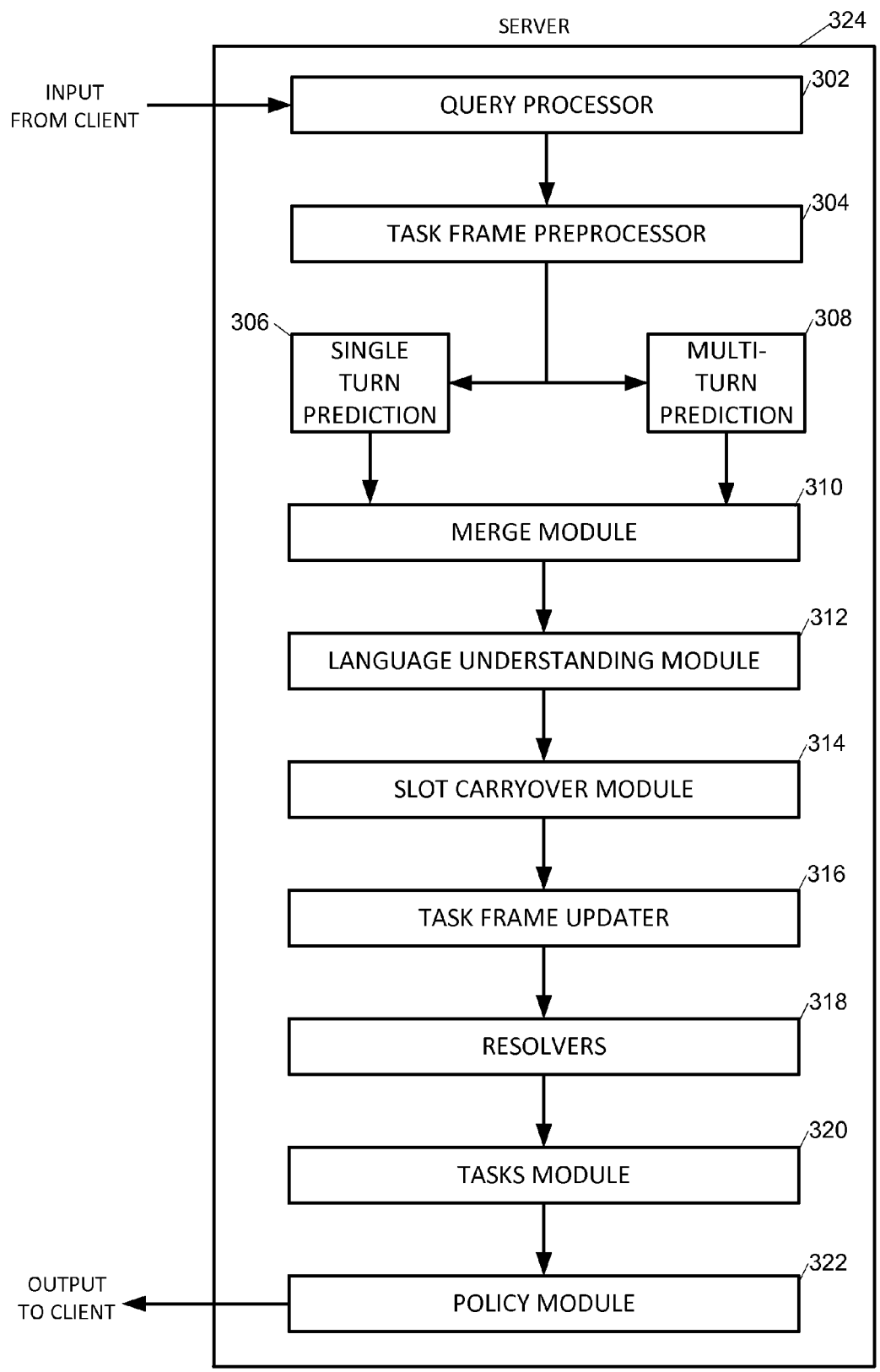
FIG. 3 illustrates an example of a system utilizing a digital assistant application with task frames.

FIG. 3 illustrates an example for a server 324 for use in a system for utilizing a digital assistant application with task frames. Server 324 may comprise a server 212 as described with respect to FIG. 2. Additionally, not all of the elements depicted in server 324 are necessary to complete a task using the task frames. Elements may be optional or the functionality of some elements may be combined into other elements. As shown in FIG. 3, input from a client is received by the server 324. The initial input from the client is generally a request to a digital assistant application to perform a task. The input from the client is first received by the query processor 302, which processes the request to determine the particular query indicated by the input from the client. Where the input also includes a task frame, such as in a scenario where the client has requested additional information from the user and an updated a task frame previously received from the server 324, a task frame preprocessor 304 analyzes the received task frame to preliminarily identify the updated parameter values, the status of the task, the state of the parameters, and any actions that need to be taken by the server 324. The task frame preprocessor may also retrieve the locally stored task frame corresponding to the received task frame and overwrite the fields that have been updated in the received task frame.

Based on the data in the task frame or the lack of receipt of a task frame, a single turn prediction model 306 or a multi-turn prediction model 308 may be used to analyze the input and determine the parameter values that can be extracted from the input. In discussing the use of the digital assistant application, a single turn may refer to a scenario where input requires no additional follow-up information. A multi-turn scenario is a scenario where multiple rounds of input are expected or required from the user in order to complete a task. Accordingly, the multi-turn prediction model 308 is more likely to be utilized after a first turn has already been completed and the user has provided additional input that has then been sent to the server 324. While based on different models, the single turn prediction model 306 and the multi-turn prediction model 308 may each be used to predict domains, intents, and slots for the input received from the client. In some examples, both the single turn prediction model 306 and the multi-turn prediction model 308 may be implemented and the results of the performed analysis may be merged by the merge model 310. A process suitable for performing such an analysis is disclosed in U.S. patent application Ser. No. 14/556,874, titled "Contextual Language Understanding for Multi-Turn Language Tasks," filed on Dec. 1, 2014, which application is incorporated by reference herein in its entirety.

A language understanding module 312 may then take the results from the merge module and determine the most likely understandings of the input received from the client. Based on that determination, a slot carryover module determines if there are any slots, such as parameters or entities, that should be carried over from a previous turn in a multi-turn scenario to be used in the current task frame. For example, different task frames may be used in a multi-turn scenario and parameters from one task frame may be carried over to a task frame for a second task. For instance, if in a first turn, the user requests "Get driving directions to Denver," a slot for "Denver" would be determined, and a task frame for the task of getting directions would be retrieved and updated with a destination parameter having a value of "Denver." If in a subsequent turn, the user then asks "How is the weather there," the slot carryover module 314 is able to carry over the slot of "Denver," such that a digital assistant application is able to understand that the user is requesting the weather in Denver. In the context of task frames, the slot carryover module is able to import the parameter from the driving directions task frame to the task frame for the task of retrieving weather. The frame parameters are also able to be carried over between mechanisms other than slot carryover module 314. For instance, in examples where slot carryover module 314 is not present in server 324, the slot carryover functionality may be implemented by task frame updater 316 based on rules or other models. In such an example, task frame updater 316 carries entities over directly between task frame parameters without reference to any slots.

The task frame updater 316 updates the parameters of the task frame identified in the input from the client, where those parameters have been determine with a certain degree of certainty, such as where the user entered text, selected an option, or the speech was easily recognized or simple speech like "yes" or "no." The task frame updater 316 also updates the status of the task frame as well as the states of the parameters in the task frame.

Resolvers 318 may also be utilized if entities or parameters need to be resolved to fill in the value for the parameter in the task frame. For instance, within the resolvers 318 there may be a resolver for a place entity, a resolver for a person entity, a resolver for a calendar entity, and a resolver for a reminder entity, among others. Each resolver is able to narrow the entity possibilities to determine the correct entity by applying predictive models and using database information that is particular to the entity that is being resolved. For instance, a place resolver may reference a database of a known list of places. The output of the resolvers 318 is typically a more concrete entity or list of entities that some action can be performed against. For instance, a specific shop complete with items such as postal address, latitude and longitude coordinates, and opening hours, among other things that, for example, allow for directions to the shop to be completed.

The tasks module 320 determines the requested task based on the analysis of the preceding modules and models. The identification of the requested task may be completed through the use of predictive models. Upon determining the requested task, the tasks module 320 retrieves the predefined task frame associated with the requested task. The tasks module 320 also fills in the values that it can for the task frame parameters, as determined by the preceding models and modules such as the resolvers 318. The tasks module 320 also updates the status of the task frame to the appropriate status once the task frame has been retrieved.

A policy module 322 may also be implemented if there are additional policies that are to be enforced or applied for a particular client or for a particular task. For example, where the task is to schedule an e-mail to be sent a later date, a policy may exist that requires a confirmation from the user at the later date before the e-mail is sent, rather than automatically sending the e-mail. The policy requirements can also be included in the task frame.

In examples, the task frame serves a master reference for all the components depicted in server 324. The task frame provides a single source for the state of a task and for the parameters for that task. By binding the components in the server 324 to the data in the task frame, overall performance of the server 324 is improved by having a single master for reference for each particular task, rather than having each component attempt to keep track of the state of the particular task or the state of the entities and parameters for each task, along with the other parameters and information related to the particular task that are included in the task frame.

While the server 324 is depicted as being a single element, the functionality of the server 324 shown in FIG. 3 may be accomplished by multiple servers and networked services, as will be appreciated by those having skill in the art. As an example, the speech recognition features of the server 324 may be performed by one service across one or more devices, and the task frame processing features of the server 324 may be performed by another service across one or more devices.

Figure 4A:
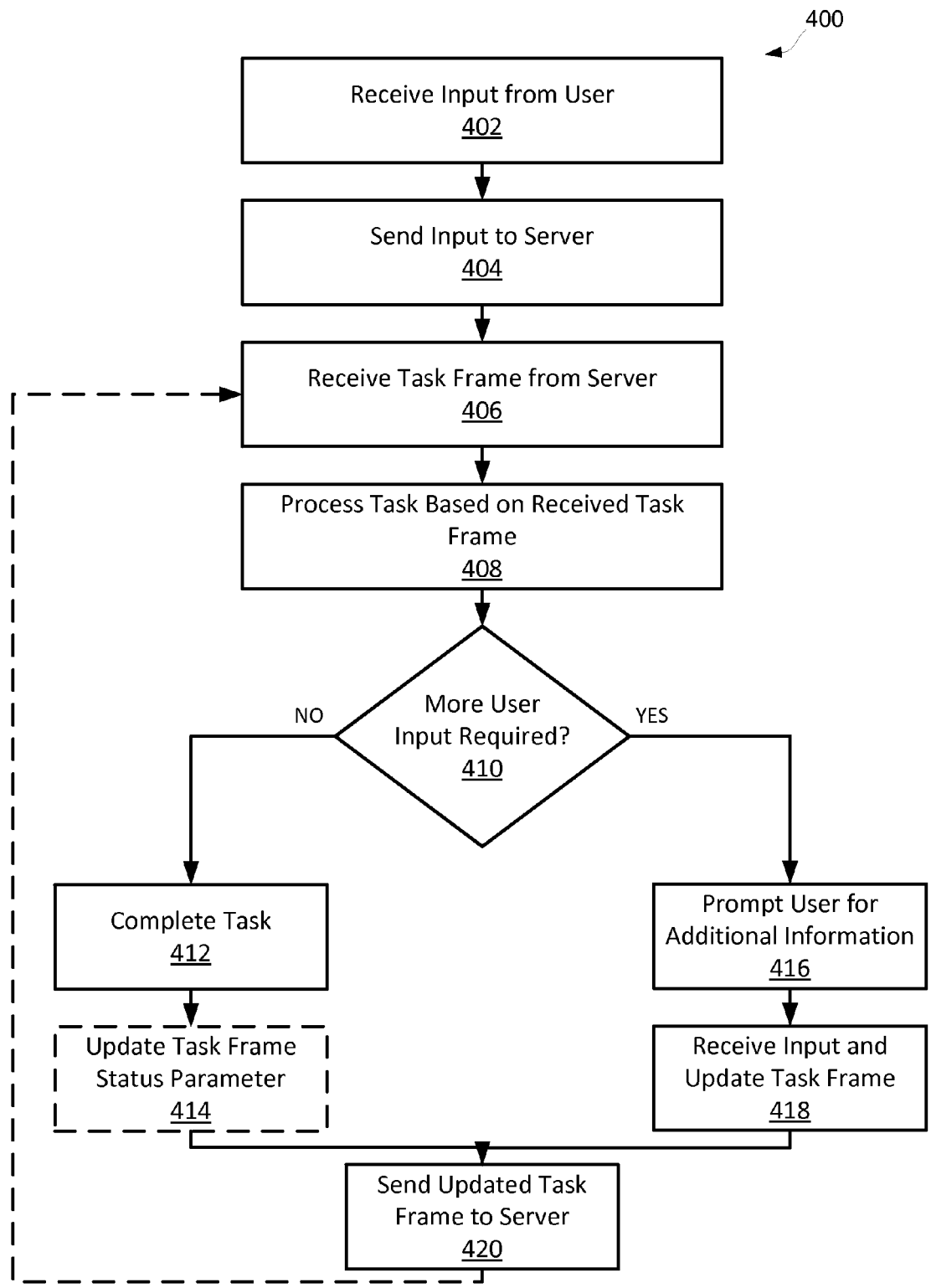
FIG. 4A depicts a method for utilizing task frames in conjunction with a digital assistant application.

FIG. 4A depicts a method 400 for utilizing task frames in conjunction with a digital assistant application. In examples, the method 400 is performed by a client device such as client device 104. While the methodology is shown and described as being a series of acts that are performed in a sequence, it is to be understood and appreciated that the methodology is not limited by the order of the sequence. For example, some acts can occur in a different order than what is described herein, as will be appreciated by those skilled in the art. In addition, some acts can occur concurrently with another act. Further, in some instances, not all acts may be required to implement a methodology described herein. Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

As depicted in FIG. 4, at operation 402, input is received from the user. The input may be in any form, such as text, touch or gesture, or speech. Initial input from a user generally is a request for a digital assistant to perform a task. Subsequent input may be intended to provide additional information required to complete a task, or the subsequent input may also be intended to initiate a new task, confirm the current task, or cancel the current task. Subsequent input need not be in the same form as the initial input. For instance, the initial input may be speech and subsequent input may be touch or gesture. At operation 404, the received input is sent to a server. The server may be one or more servers for performing services such as speech recognition. The server or servers are also responsible for retrieving and populating a task frame after determining the appropriate task from the input received at operation 402.

At operation 404, a task frame is received from the server. Where the input received at operation 402 was to request a new task to be initiated, the received task frame is specific to the requested task. Where the input was a subsequent turn in a multi-turn scenario for an ongoing task, the task frame may be an updated task frame for which the client has received a previous form. Distinguishing a new task frame from a sequence of task frames is possible from comparing the status value in the task frame.

The received task frame is processed at operation 408. Processing the task frame includes analyzing the data fields, including the status value, in the task frame. In processing the received task frame, additional actions that need to be performed are determined. For example, at operation 410, a determination is made as to whether more input is required to complete the task identified in the task frame.

If at operation 410 it is determined that no additional user input is required, the task is completed at operation 412. Completing the task may involve presenting the results of the task to the user. Particular task-specific finalizing actions may also need to be taken to complete the task. For example, where the task is to add a contact to a contact list, the actions for completing the task may include adding the contact to the contacts list on a client device and presenting an indication to the user that the task has been completed. As another example, where the task is to place a call, the actions necessary to complete the task include initiating a voice-calling application to initiate the call as requested. In examples, all the parameters, such as the contact information, required for completing an action for the task are contained in the task frame itself. Following any actions required to complete the task, the task frame status may be updated to indicate the task is complete. The updated task frame may also be sent to the server in operation 420.

If at operation 410 it is determined that additional input is required to complete the task, the user is prompted for the additional information. The necessary parameters for prompting the user are included in the task frame. In examples, a field of the task frame explicitly provides the exact text that is to be output to the user. At operation 418, input from the user responsive to the prompt is received and the task frame is updated based on that information. Additionally, the status of the task frame is also updated and the state of the updated parameters may also be updated. After updating the task frame, the updated task frame is sent to the server at operation 420. Portions of method 400 will continue until the task is completed. For example, after sending the updated task frame to the server in operation 420, the server may process and update the task frame and return another updated task frame. That updated task frame is received at operation 406, and the remainder of method 400 is continued from operation 406 until the task is completed.

Figure 4B:
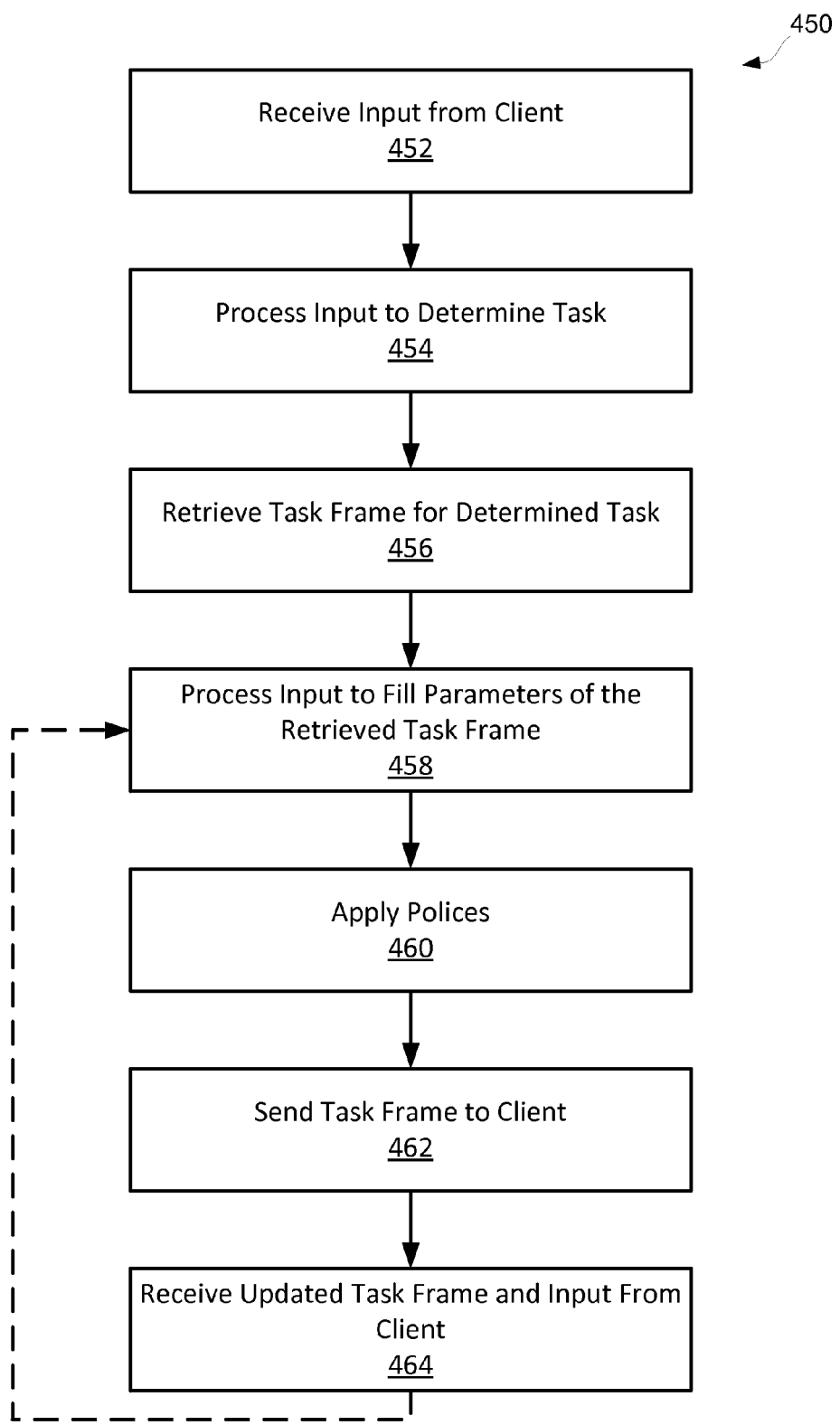
FIG. 4B depicts a method for utilizing task frames in conjunction with a digital assistant application.

FIG. 4B depicts a method 450 for utilizing task frames in conjunction with a digital assistant application. In examples, the method 400 is performed by a service having at least one server such as server 212, server 324, or a combination of multiple servers. At operation 452, input is received from a client device. The input may include any type of input, such as speech, touch, or text. Generally, the initial input is intended to request that a digital assistant application perform a task. At operation 454, the input is processed to determine the requested task. This determination may be accomplished through the use of prediction models such as predictive language understanding models. Upon determining the appropriate task, the task frame corresponding to the determined task is retrieved at operation 456. The input is then further processed at operation 458 to fill the values of the parameters of the retrieved task frame. For example, the input may be analyzed using predictive models and language understanding models to determine the slots or entities in the received in the input. The determined slots or entities are then mapped to the appropriate values of parameters in the retrieved task frame. Additional policies may be applied at operation 460 if there are any additional policies that are particular to the task or client.

Once the task frame has been filled in to the extent possible from the received input, the task frame is sent to the client at operation 462. The client processes the task frame and, if necessary, requests additional input from the user and updates the task frame. The updated task frame and any input collected by the client are received at operation 464. If the task is not yet complete, portions of method 450 are repeated. For instance the input received in operation 464 is processed again to fill in the remaining parameters. The task frame is also updated and again returned to the client. The process continues until the task is completed.

Figure 5:
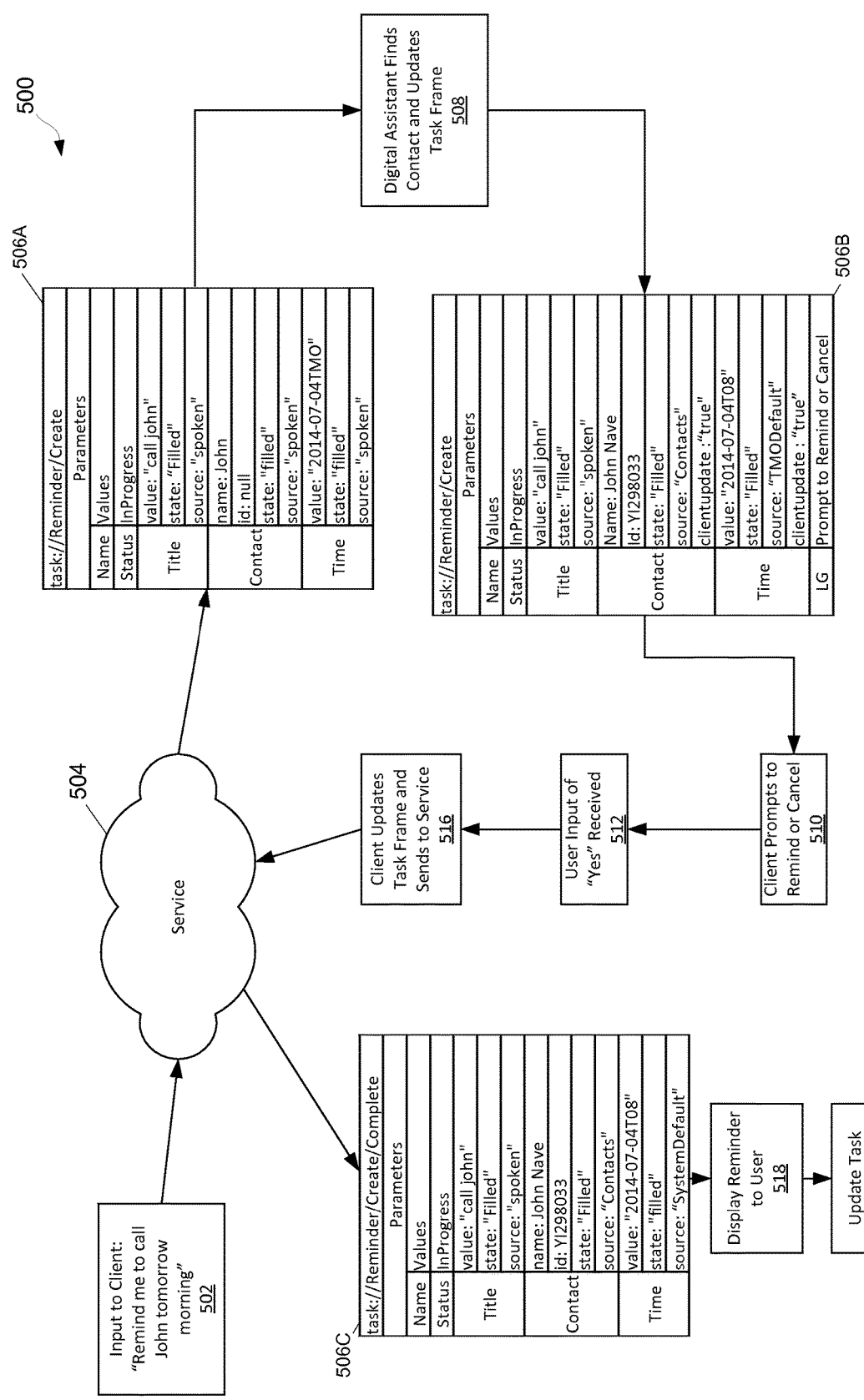
FIG. 5 depicts an example flow diagram for utilizing task frames in conjunction with a digital personal assistant application.

FIG. 5 depicts an example flow diagram 500 for utilizing task frames in conjunction with a digital assistant application. The particular example flow diagram shown in FIG. 5 is for setting a reminder to call a contact at a certain time. As shown, an input of "Remind me to call John tomorrow morning" is received 502 by the client as spoken input. That input is then sent to a service 504. Service 504 may comprise one or more servers, such as servers 212 and 324, along with additional components or servers. The service 504 processes the input to determine the appropriate task and retrieve the respective task frame. The service 504 also fills in the possible parameter values through natural language understanding algorithms implemented through prediction models. Once the possible parameter values are filled in and the status and states are updated, the task frame is task frame 506A.

The task frame 506A indicates the location of the task is task://Reminder/Create/. Multiple parameters are also provided for in the task frame 506A. The value for the status of the task is "InProgress," indicating that the task has not yet been completed. The title parameter has multiple values. The value for the title parameter is "call john." The state of the parameter is "Filled," indicating that the value for the parameter has been filled. The value for the source of the parameter is "spoken," indicating that the input from which the parameter was derived was spoken input. The contact parameter also has several values. For instance, based on natural language processing of the spoken input, the contact name was determined to be "John." There is no Id yet associated with the contact, and therefore the value for Id is null. The state of the contact parameter is "filled" and the source is "spoken" because the contact name "John" was derived from spoken input. The Time parameter also has several values. The value for the time is "2014-07-04TMO" indicating the time at which the reminder is to occur. The state of the parameter is "filled" and the source is "spoken" because the time at which the reminder is to occur was derived from spoken input.

The client receives the task frame 506A and the digital assistant application understands from the task frame 506A that the contact has not yet been effectively resolved because, in part, there is no Id for the contact. The digital assistant application finds 508 the contact and updates the task frame 506A with the contact information for "John" in the user's contact list residing on the client device. In updating the task frame, the client may also apply a local policy regarding an appropriate time for "morning" or "tomorrow." Based on local policies or user settings or habits, the client device may determine that "tomorrow" or "morning" corresponds to 8:00 AM. Based on that determination, the client updates the Time parameter of the task frame 506A. That policy may also be considered a source. For example, the value for the source may be updated to "TMODefault," corresponding to the default policy for handling "tomorrow" as input. The updates to the task frame 506A results in an updated task frame 506B.

As can be seen in task frame 506B, the Contact and Time parameters have been updated. The name value for the Contact parameter has been updated to "John Nave," and the Id value has been updated to "YI298033." Because the Contact parameter has now been determined based on the user's contact list, the source value for the Contact parameter is now "Contacts." An additional "clientupdate" field is also shown in the Contact parameter that indicates whether client input is required. The Boolean value of true indicates that a client update or input is required.

Where client update is required, the task frame may also include what is to be performed by the digital assistant application as indicated by an "LG" or "Language Generation" parameter. In the updated task frame 506B, the value for "LG" is "Prompt to Remind or Cancel," which directs the digital assistant application to prompt the user to confirm the reminder or cancel the task.

Based on the updated task frame 506B and the processing of the updated task frame 506B by the digital assistant application, the client device prompts 510 the user to confirm the reminder or cancel the task. The action of prompting the user may include presenting the user with the question "Should I set the reminder?" and presenting options such as "Yes" or "No."

In the particular example depicted in FIG. 5, the user responds with "yes," which is received 512 by the client device. Based on the input of "yes," the client device updates 516 the task and sends the updated task frame to the service 504. The update to the task frame includes updating the task frame status to indicate that the present task has been confirmed, and in some examples that the task is complete from the perspective of the client. Depending on the particular client device and the particular task, the task may be created and stored locally. For example, where the client device is a smart phone, the reminder task may be completed and stored locally such that the reminder will occur regardless of whether the client is connected to the service 504. In other examples, the reminder may be completed and stored at the service 504 such that no matter which client device the user has connected to the service 504 at the time of the reminder, the user will still receive the reminder. In other examples, the task will be completed and stored on both the client device and the service 504. In examples of the example depicted in FIG. 5, the process may end and be completed after updating 516 the task frame and sending to the service where the task frame is finalized.

In other examples, as shown in FIG. 5, the service may update the task frame 506B to form another updated task frame 506C. As can be seen from the task frame 506C, a subtask of "complete" has been called for the create reminder task. The location of this subtask is indicated in the task frame in the first row of the task frame 506C, which reads "task://Reminder/Create/Complete." This subtask is to complete the creation of the reminder requested by the user. Because the substask is to complete the creation of the reminder task, the status of the subtask is still "InProgress." The parameters for the Complete substask have been carried over from the parent Create subtask. The updated task frame 506C is sent to the client device, where the client device processes the task frame 506C and completes the creation of the Reminder task. In completing the Reminder task, the client device displays 518 the completed Reminder to the user. The client device then updates 518 the status of the task frame 506C to "complete," and, in some examples, sends the updated task frame back to the service 504.

While the example depicted in FIG. 5, is for a particular Reminder task, it should be appreciated that similar flow diagrams and task frames are applicable for different tasks. In addition, the particular task frame for the reminder task is one example of the reminder task frame. For example, another task frame for the reminder task frame may be as follows:

```
Reminder:
{
    "URI": "task://Reminder",
    "Version": "1.0",
    "Status": TaskStatus,
    "State": EntityStatus
    "Source": <SourceValue>
    "ClientUpdate": Boolean
    "Condition": ReminderConditionType
    "Id": GUID
    "Title": TextData
    "Person": [Contact]
    "Location": [Place]
    "UnresolvedLocation": TextData
    "Time": <TimeValue>
    "UnresolvedContactName": TextData
}
```

This reminder task frame has multiple parameters that can be required or optional depending on the example and, in some scenarios, the other parameters. For example, the Condition parameter determines the type of condition that triggers the reminder. The value for the Condition parameter "ReminderConditionType" is represented by the following and may be several different values:

```
ReminderConditionType
{
    None,
    Time,
    ArrivingLocation,
    LeavingLocation,
    Person,
    Invalid
}
```

The reminder condition type of Time indicates that the reminder should be triggered at a particular time, the ArrivingLocation condition indicates that the reminder should trigger when the client device arrives at a particular location, the LeavingLocation type indicates that the reminder should trigger when the client device leaves a particular location, and the Person type indicates that the reminder should trigger when contact is made with a particular person. The other types of "None" and "Invalid" indicate that the condition type needs to be requested from the user. The condition type is generally derived from the initial user input requesting a reminder task to be created. For example, the user may verbally ask for a reminder to be set a certain time or for a certain place. The speech input is analyzed by a language understanding system to determine the particular condition type and the task frame is updated based on that determination.

Depending on the reminder condition type, some of the parameters may become required and others may be optional. For instance, where the condition type is Time, the Time parameter in the reminder task frame becomes required, whereas the location parameter becomes optional. An optional parameter is one that is not necessary to complete the task. In the particular example of a time-based reminder, the time is a required parameter because a time for the reminder is necessary to complete the task. Location information for a time-based reminder, however, is not necessary to complete the task.

The "unresolved" parameters in the reminder task frame store data that is determined from the user input, but has yet to be resolved to a particular entity. For instance, if the user states the name "John," the value for "UnresolvedContactName" may be "John." Once "John" has been resolved to particular contact, a "Person" or other contact parameter is updated.

As discussed above, by having all the information required to complete a task stored in the task frame, a more efficient and collaborative task process can be completed a digital assistant application. With reference to the reminder task example, multiple components include speech recognizers, language understanding systems, and digital assistant applications, among other components across potentially multiple devices are all able to work together by having the information required located in the task frame that is shared by and referenced by the components.

Figure 6:
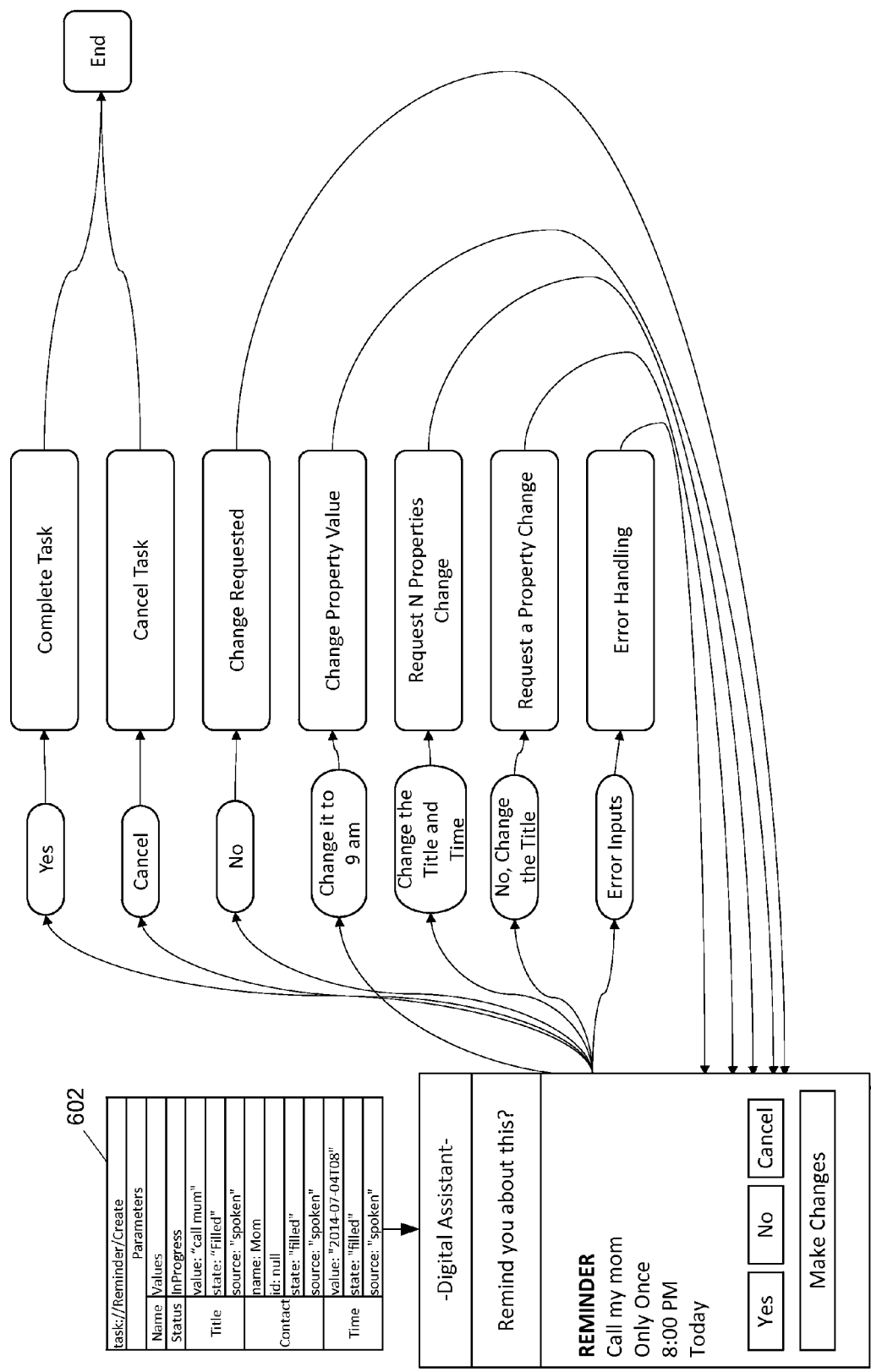
FIG. 6 depicts an example flow diagram for utilizing task frames in conjunction with a digital assistant application.

FIG. 6 depicts an example state diagram for utilizing task frames in conjunction with a digital assistant application. The particular example depicted in FIG. 6 is a state diagram for a Reminder task. In the example, the client device has received the spoken input of "Remind me to call my mum tomorrow at 8 am." The client device has sent that input to a service to be processed. The service has returned task frame 602 to the client device. Based on the task frame, the client device displays an example user interface 604 to the user. The user interface 604 asks the user "Remind you about this?," provides details about the reminder, and presents options that the user can select, including Yes, No, Cancel, and Make Changes. In examples, the user is also able to provide input as speech to the select one of the options, or provide additional information.

As shown, if the user selects yes, the task can be completed and the status of the task can be changed to complete. If the user selects Cancel, the task is canceled and the status of the task is updated to canceled. If the user selects No, that option is interpreted that the change is requested and the task status is updated to reflect that a change has been requested. If the user responds "Change it to 9 am," the Time parameter is updated along with the task status and the parameter state. If the user responds with a request to change the title and time, the title and time parameters and updated along with the task status and the parameter states. If the user responds, "No, change the title," the user is prompted with a request for a new title. Upon receipt of the new title from the user, the respective parameter in the task frame is updated along with the status of the task and the state of the parameter.

Figure 7:
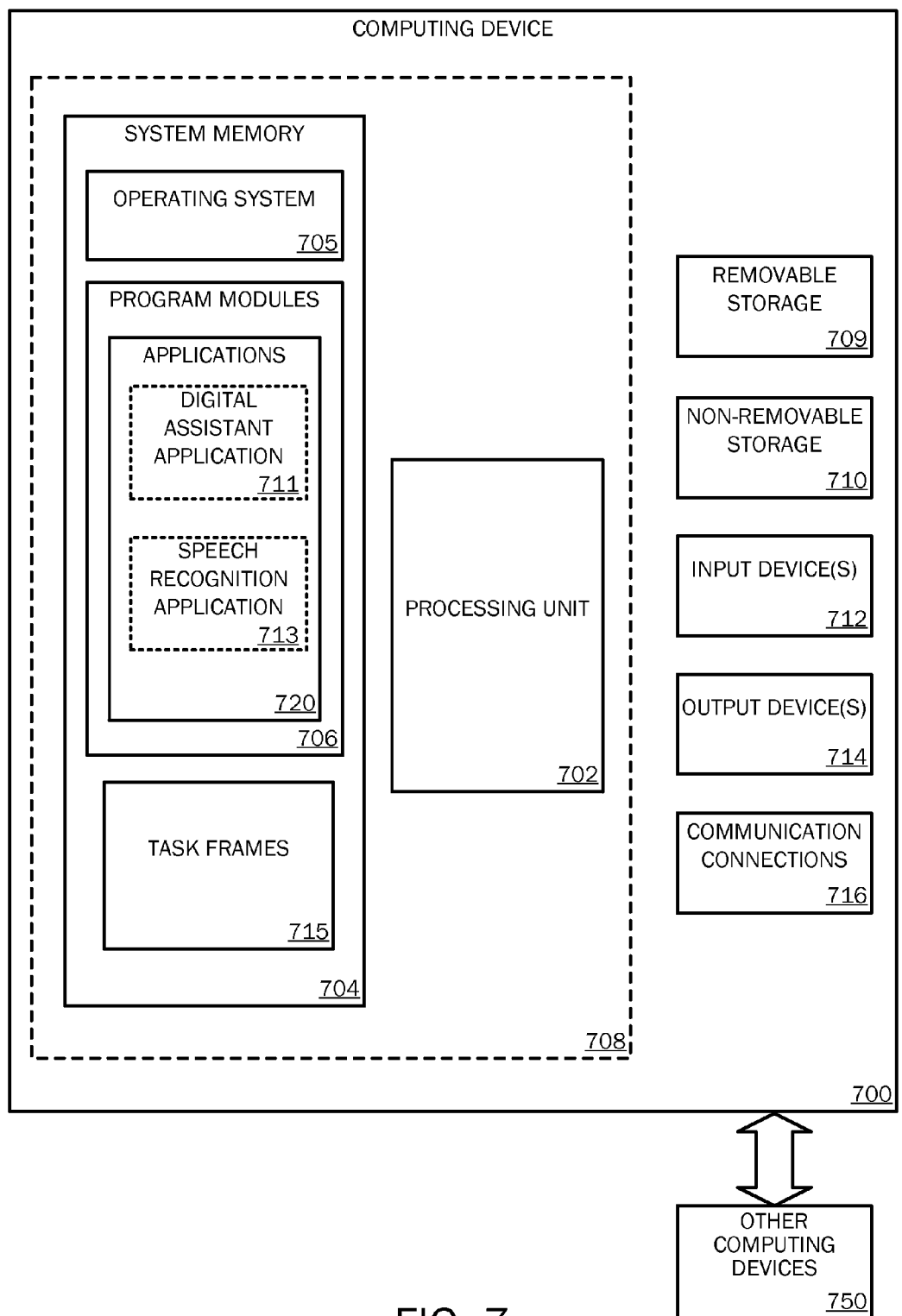
FIG. 7 is a block diagram illustrating example physical components of a computing device with which examples of the disclosure may be practiced.

FIG. 7 is a block diagram illustrating physical components (e.g., hardware) of a computing device 700 with which examples of the disclosure may be practiced. The computing device components described below may have computer executable instructions for a speech recognition application 713, e.g., of a client or server and/or computer executable instructions for digital assistant application 711, e.g., of a client or server, that can be executed to employ the methods disclosed herein. Digital assistant application 711 may be on a client such as client device 104 or client device 203. Components of the digital assistant application 711 may also be on a server such as server 212 or server 314. Similarly, speech recognition application 713 may be on a server such as server 212 or server 314. Speech recognition application 713, or components thereof, may also be on a client device, such as client device 104 or client device 203. The computing device components may also store one or more task frames 715, such as the task frames 715 shared between a client and a server, such as client device 104 or client device 203 and server 212 or server 314. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such digital assistant applications as discussed with regard to FIGS. 1-6. The operating system 705, for example, may be suitable for controlling the operation of the computing device 700. Furthermore, examples of the disclosure may be practiced in conjunction with a graphics library, audio library, speech database, speech synthesis applications, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., digital assistant application 711 or speech recognition application 713) may perform processes including, but not limited to, the examples as described herein. Other program modules that may be used in accordance with examples of the present disclosure, and in particular to generate screen content and audio content, may include electronic mail and contacts applications, word processing applications, spreadsheet applications, database applications, slide presentation applications, drawing, messaging applications, mapping applications, speech-to-text applications, text-to-speech applications, and/or computer-aided application programs, intelligent assistant applications, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. Such input devices may be utilized in conjunction with input receiving module 202. The output device(s) 714 such as a display, speakers, a printer, etc. may also be included. Such output devices may be utilized in conjunction with output module 204. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal. Computer storage media may be stored, incorporated into, or utilized in conjunction with computer storage devices.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
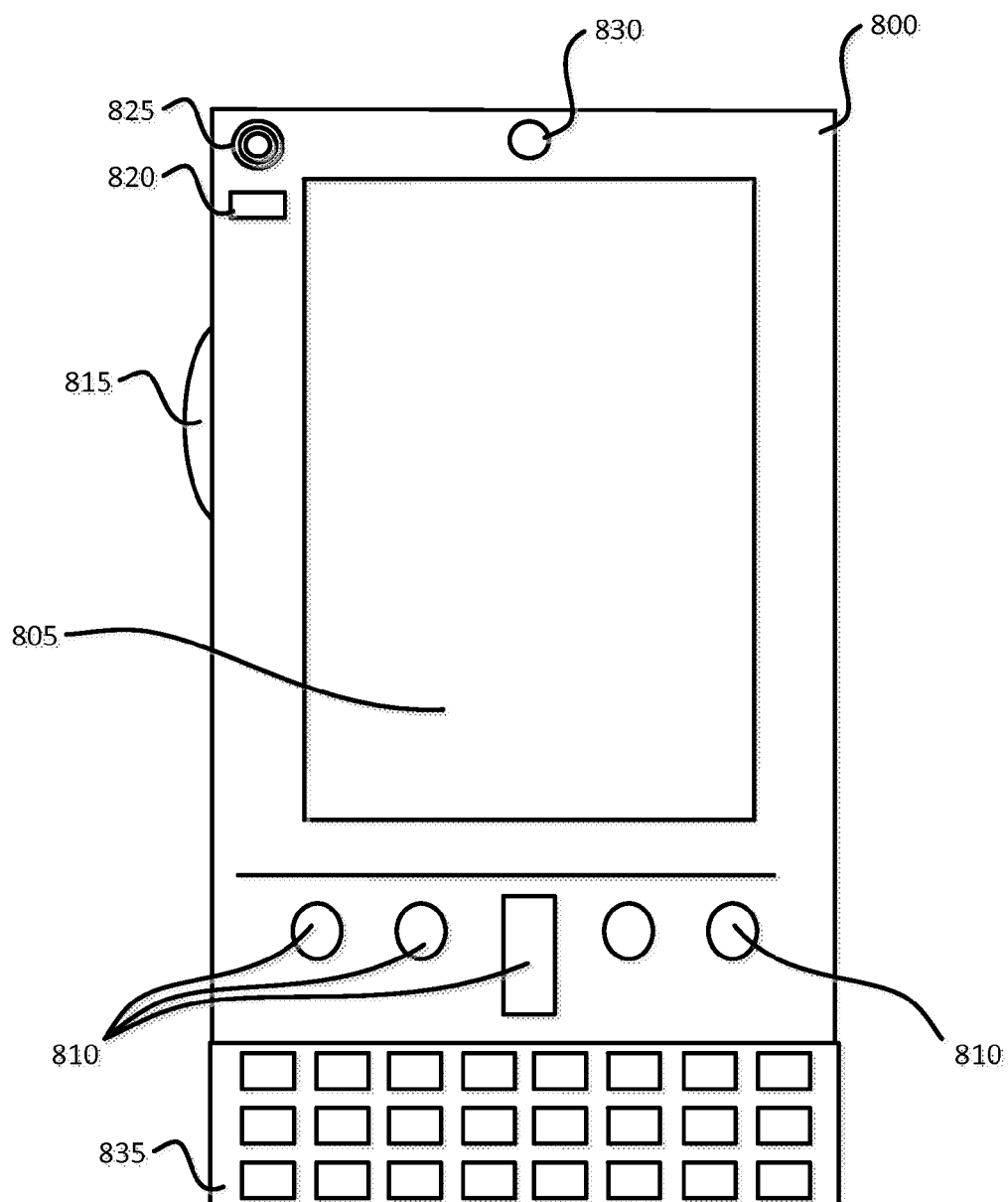
FIGS. 8A and 8B are simplified block diagrams of a mobile computing device with which examples of the present disclosure may be practiced.
Figure 8B:
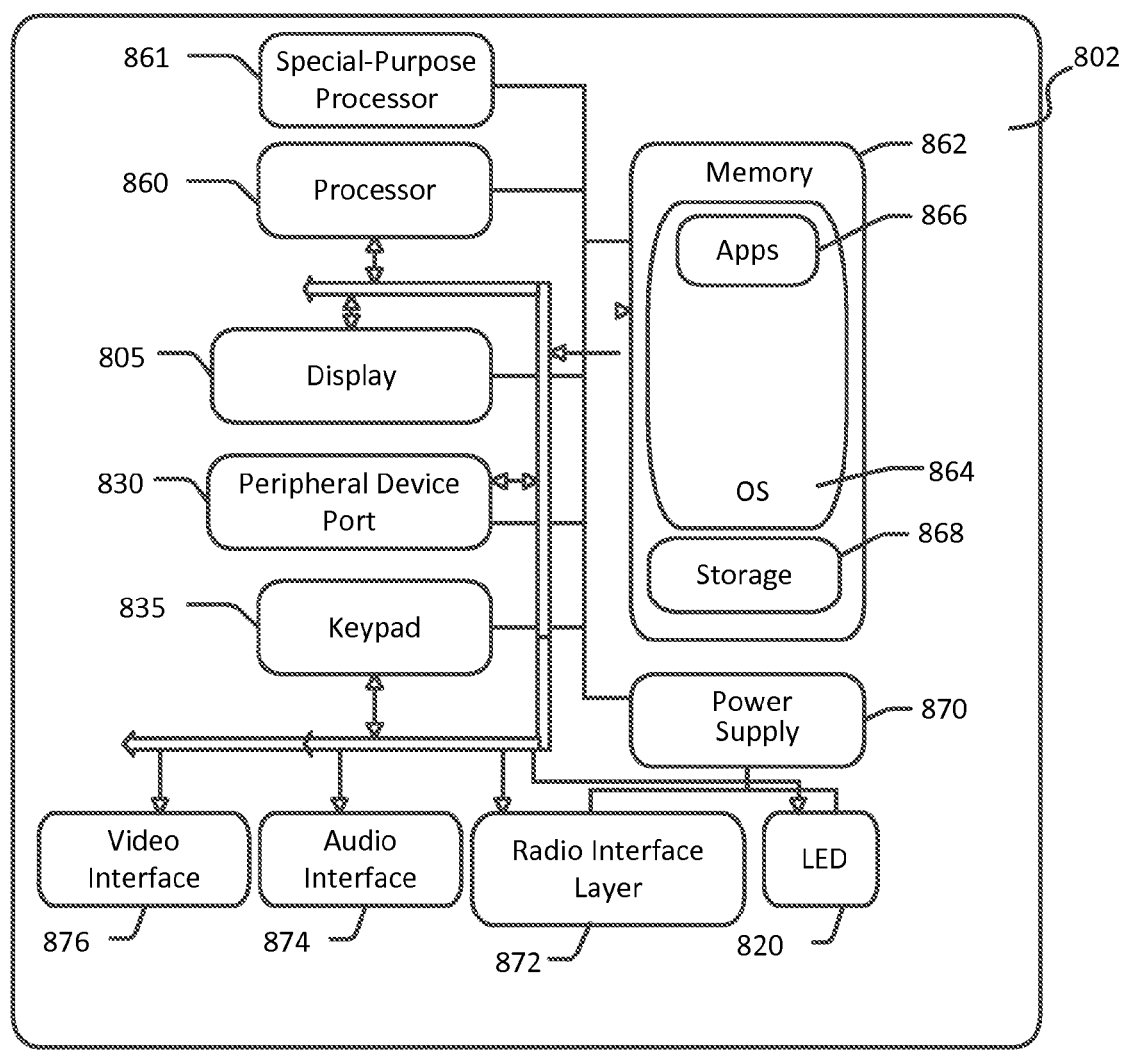

FIGS. 8A and 8B illustrate a mobile computing device 800, for example, a mobile telephone, a smart phone, wearable computer (such as a smart watch), a tablet computer, a laptop computer, and the like, with which examples of the disclosure may be practiced. In some examples, the client may be a mobile computing device. With reference to FIG. 8A, one example of a mobile computing device 800 for implementing the examples is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative examples, mobile computing device 800 may incorporate more or less input elements. For example, the display 805 may not be a touch screen in some examples. In yet another alternative example, the mobile computing device 800 is a portable phone system, such as a cellular phone. The mobile computing device 800 may also include an optional keypad 835. Optional keypad 835 may be a physical keypad or a "soft" keypad generated on the touch screen display. In various examples, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 may incorporate a system (e.g., an architecture) 802 to implement some examples. In one example, the system 802 is implemented as a "smart phone" capable of running one or more applications (e.g., browser, e-mail, calendaring, contact managers, messaging clients, games, text-to-speech applications, and media clients/players). In some examples, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, text-to-speech applications, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions to utilize task frames as part of a digital assistant application (e.g., and/or optionally digital assistant application 711).

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation or capture speech for speech recognition. In accordance with examples of the present disclosure, the microphone may also serve as an audio sensor to facilitate control of notifications. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

Figure 9:
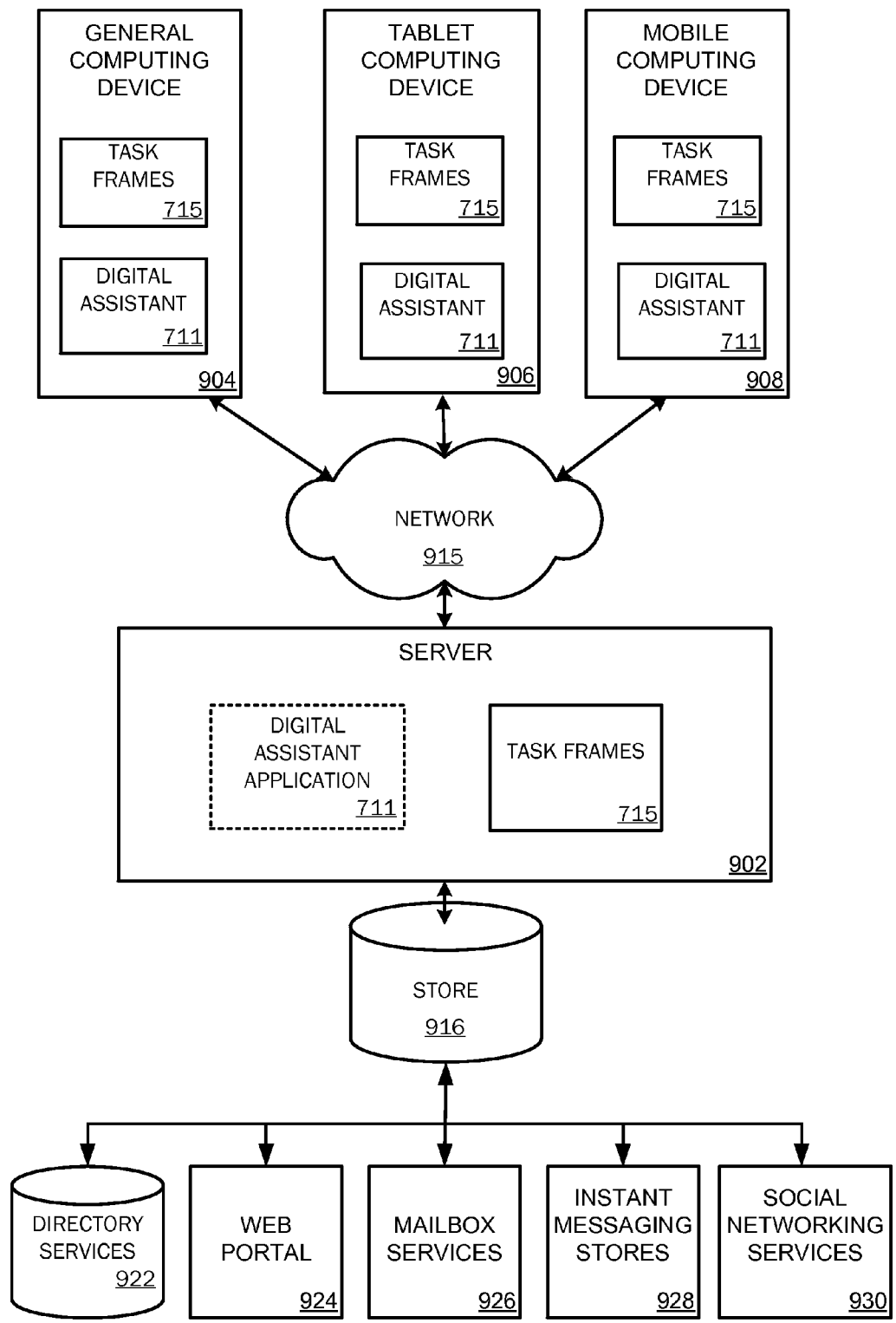
FIG. 9 is a simplified block diagram of a distributed computing system in which examples of the present disclosure may be practiced.

FIG. 9 illustrates one example of the architecture of a system for processing data received at a computing system from a remote source, such as a computing device 904, tablet 906, or mobile device 908, as described above. Content displayed at server device 902 may be stored in different communication channels or other storage types. For example, various documents may be stored using a directory service 922, a web portal 924, a mailbox service 926, an instant messaging store 928, or a social networking site 930. The digital assistant application 711 may be employed by a client who communicates with server 902. The clients communicating with the server also store and utilize task frames 715 in conjunction with the digital assistant application 711. The server 902 may provide data to and from a client computing device such as a personal computer 904, a tablet computing device 906 and/or a mobile computing device 908 (e.g., a smart phone) through a network 915. For example, the server 902 may provide task frames 715 to clients and receive task frames 715 back from clients. Components of the digital assistant application 711 may also reside on the server 902. Server 902 may comprise server 212 or server 324 or a combination thereof. By way of example, the computer system described above may be embodied in a personal computer 904, a tablet computing device 906 and/or a mobile computing device 908 (e.g., a smart phone). Any of these examples of the computing devices may obtain content from the store 916, in addition to receiving graphical data useable to be either pre-processed at a graphic-originating system, or post-processed at a receiving computing system.

Figure 10:
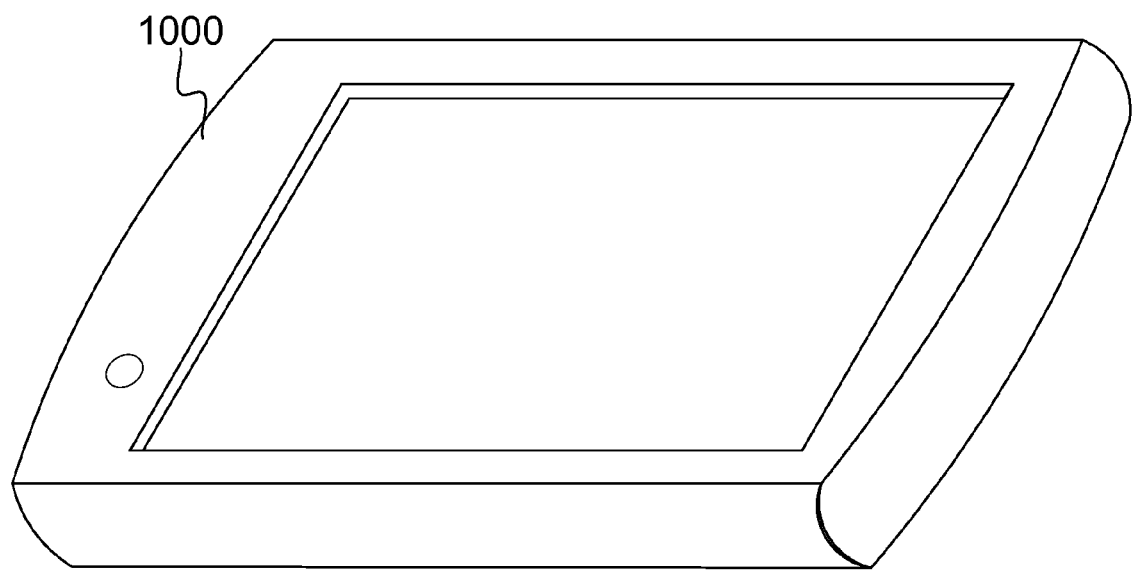
FIG. 10 illustrates a tablet computing device for executing one or more examples of the present disclosure.

FIG. 10 illustrates an exemplary tablet computing device 1000 that may execute one or more examples disclosed herein. Tablet computing device 1000 may comprise a client device 124 or a client device 203. In addition, the examples and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Examples of the present disclosure, for example, are described above with reference to block diagrams and/or operational illustrations of methods, systems, and computer program products according to examples of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

In addition, to protect the privacy of the user, any aggregation of potentially confidential data of or from a user or resulting from the input of a user may first be anonymized prior to being utilized in the systems and methods disclosed herein. Such anonymization may include the removal of some or all metadata or other data that may connect the results to be utilized to the individual user. The level of desired anonymization may be selected or customized by the user.

The description and illustration of one or more examples provided in this application are not intended to limit or restrict the scope of the disclosure as claimed in any way. The examples, examples, and details provided in this application are considered sufficient to convey possession and enable others to make and use the best mode of claimed disclosure. Further, the terms "exemplary" and "illustrative" are meant only to be indicative of examples, and not to designate one example necessarily being more useful or beneficial over any other example. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

The invention claimed is:

1. A system comprising:
at least one processor; and
memory communicatively coupled to the at least one processor, encoding computer executable instructions that, when executed by the at least one processor perform a method, the method comprising:
receiving initial input at a client, wherein the input requests a digital assistant application to perform a task;
sending the initial input to a remote service;
receiving, by the client from the remote service, a predefined task frame to serve as a master reference for completing the task, wherein the task frame is a non-graphical-user-interface (GUI) data structure including a value for a status of the task and two or more required parameters to complete the task, wherein the task frame includes a name and a value for each of the two or more required parameters;
based on the task frame, determining, by the client, a next action to complete the task;
performing, by the client, the next action to complete the task;
based on performance of the task, updating, by the client, the task frame by updating one or more values for at least one of the two or more required parameters to create an updated task frame;
sending, by the client, the updated task frame to the remote service; and
receiving, by the client, a further updated version of the task frame from the remote service, wherein at least one of a value for a task frame parameter and a status of the task frame in the further updated task frame has been updated by the remote service.

2. The system of claim 1, wherein the method further comprises:
prompting a user for additional input based on the task frame;
receiving the additional input; and
wherein updating the task frame comprises:
updating one or more values for one or more task frame parameters based on the received additional input; and
updating the status of the task frame.

3. The system of claim 2, wherein the two or more task frame parameters each have a value indicating a source from which the parameter was received and a value indicating a state of the task frame parameter.

4. The system of claim 3, wherein the source of the initial input is of a first source type and the source of the additional input is of a second source type, the first and second source types comprise at least one of spoken, touch, gesture, and text.

5. The system of claim 3, wherein the method further comprises, for each of the updated one or more task frame parameters, updating the state of the task frame parameter.

6. The system of claim 1, wherein the status of the tasks indicates at least one of the following: the task is in progress, the task is completed, and the task is canceled.

7. The system of claim 1, wherein the method further comprises processing the further updated task frame updated by the service to determine if additional input is required; and updating the status of the task frame.

8. A computer-implemented method comprising:
receiving initial input at a client, wherein the input requests a digital assistant application to perform a task;
sending the initial input to a remote service;
receiving, by the client from the remote service, a predefined task frame to serve as a master reference for completing the task, wherein the task frame is a non-GUI data structure having one or more fields for at least one value for a status of the task and two or more required parameters to complete the task, wherein the task frame includes a name and a value for each of the two or more required parameters;
based on the task frame, determining a next action for completing the task;
performing the next action to complete the task;
based on performance of the task, updating the task frame by updating one or more values for at least one of the one or more required parameters to create an updated task frame;
sending the updated task frame to the remote service; and
receiving, by the client, a further updated version of the task frame from the remote service, wherein at least one of a value for a task frame parameter and a status of the task frame in the further updated task frame has been updated by the remote service.

9. The method of claim 8, wherein the method further comprises:
prompting a user for additional input;
receiving the additional input; and
wherein updating the task frame comprises:
updating one or more values for one or more task frame parameters based on the received additional input; and
updating the status of the task frame.

10. The method of claim 9, wherein the one or more task frame parameters each have a value indicating a source from which the parameter was received and a value indicating a state of the task frame parameter.

11. The method of claim 10, wherein the source of the initial input is of a first source type and the source of the additional input is of a second source type, the first and second source types comprise at least one of spoken, touch, gesture, and text.

12. The system of claim 10, wherein the method further comprises for each of the updated one or more task frame parameters, updating the state of the task frame parameter.

13. The method of claim 9, wherein the method further comprises:
processing the task frame updated by the service to determine if additional input is required; and
updating the status of the task frame.

14. The method of claim 8, wherein the task frame includes all required parameters necessary to complete the task.

15. A system comprising:
at least one processor; and
memory communicatively coupled to the at least one processor, encoding computer executable instructions that, when executed by the at least one processor perform a method, the method comprising:
receiving, at a service operating on one or more servers, input from a remote client;
processing the input to determine a requested task;
retrieving, from a plurality of predefined task frames, a predefined task frame to serve as a master reference for the requested task, wherein the predefined task frame is a non-GUI data structure that includes two or more parameters required for completing the requested task and a status for the two or more parameters, wherein the task frame includes a name and a value for each of the one or more required parameters;
processing the input to determine one or more values for the one or more task frame parameters required for completing the requested task;
updating the task frame with the determined parameter values; and
sending the task frame to the client; and
receiving an updated version of the task frame from the client, wherein at least one of a value for a task frame parameter and a status of the task frame in the updated task frame has been updated by the client.

16. The system of claim 15, the method further comprising:
receiving additional input from the client;
processing the additional input from the client to determine one or more values for one or more parameters of the updated task frame;
updating the one or more values for the one or more parameters of the updated task frame; and
sending the updated task frame back to the client.

17. The system of claim 15, wherein the method further comprises: determining if additional user input is required to complete the task; and updating the task frame to indicate that the client is to prompt a user for additional input.

18. The system of claim 15, wherein the parameters in the task frame are used as a reference for any components in the system utilized in completing the task.

19. The system of claim 16, wherein one or more task frame parameters each have a value indicating the source from which the parameter was received and a value indicating the state of the parameter.

20. The system of claim 16, wherein the task frame comprises all required parameters necessary to complete the task.

* * * * *